(12) United States Patent
Kushner

(10) Patent No.: US 9,813,514 B2
(45) Date of Patent: Nov. 7, 2017

(54) INFORMATION REPOSITORY SYSTEM INCLUDING A WIRELESS DEVICE AND RELATED METHOD

(71) Applicant: Good Technology Holdings Limited, Waterloo (CA)

(72) Inventor: Gary Kushner, San Francisco, CA (US)

(73) Assignee: Good Technology Holdings Limited, Waterloo, Ontario (CA)

( * ) Notice: Subject to any disclaimer, the term of this patent is extended or adjusted under 35 U.S.C. 154(b) by 0 days.

(21) Appl. No.: 14/951,350

(22) Filed: Nov. 24, 2015

(65) Prior Publication Data

US 2016/0080514 A1 Mar. 17, 2016

Related U.S. Application Data

(63) Continuation of application No. 10/171,048, filed on Jun. 12, 2002, now abandoned.

(51) Int. Cl.
*H04L 12/58* (2006.01)
*H04L 29/08* (2006.01)

(52) U.S. Cl.
CPC .............. *H04L 67/26* (2013.01); *H04L 67/10* (2013.01)

(58) Field of Classification Search
CPC ...... H04W 4/02; H04W 4/12; H04L 29/08108
USPC ..... 455/412.1–412.2, 414.1–414.4; 709/206, 709/217–219
See application file for complete search history.

(56) References Cited

U.S. PATENT DOCUMENTS

| | | |
|---|---|---|
| 4,682,150 A | 7/1987 | Mathes et al. |
| 4,882,752 A | 11/1989 | Lindman et al. |
| 5,049,881 A | 9/1991 | Gibson et al. |
| 5,115,392 A | 5/1992 | Takamoto et al. |
| 5,126,739 A | 6/1992 | Whiting et al. |
| 5,159,592 A | 10/1992 | Perkins |
| 5,220,501 A | 6/1993 | Lawlor et al. |
| 5,237,614 A | 8/1993 | Weiss |
| 5,321,840 A | 6/1994 | Ahlin |
| 5,392,390 A | 2/1995 | Crozier |
| 5,434,994 A | 7/1995 | Shaheen et al. |

(Continued)

FOREIGN PATENT DOCUMENTS

| | | |
|---|---|---|
| EP | 0666651 A2 | 8/1995 |
| EP | 0684558 | 11/1995 |

(Continued)

OTHER PUBLICATIONS

Hild, Stefan G. "Mobilizing Applications", IEEE Personal Communications XP-000721303 1070-9916/97 (Oct. 1997), pp. 26-34.

(Continued)

*Primary Examiner* — Anthony Addy
*Assistant Examiner* — Matthew Genack
(74) *Attorney, Agent, or Firm* — Fish & Richardson P.C.

(57) ABSTRACT

An information repository system comprises a wireless device configured to receive a first version of information from a server. The first version of information has a first unique identifier associated therewith. The information repository is configured to store the first version of information having the first unique identifier and is configured to store a second version of the information having the first unique identifier. The second version of information overwrites the first version of information.

24 Claims, 11 Drawing Sheets

(56) References Cited

U.S. PATENT DOCUMENTS

| | | | |
|---|---|---|---|
| 5,469,161 | A | 11/1995 | Bezek |
| 5,519,606 | A | 5/1996 | Frid-Nielsen et al. |
| 5,521,597 | A | 5/1996 | Dimitri |
| 5,553,281 | A | 9/1996 | Brown et al. |
| 5,559,800 | A | 9/1996 | Mousseau et al. |
| 5,563,595 | A | 10/1996 | Strohacker |
| 5,613,012 | A | 3/1997 | Hoffman et al. |
| 5,664,207 | A | 9/1997 | Crumpler et al. |
| 5,666,530 | A | 9/1997 | Clark et al. |
| 5,694,546 | A | 12/1997 | Reisman |
| 5,715,387 | A | 2/1998 | Barnstijn et al. |
| 5,721,907 | A | 2/1998 | Pyne |
| 5,727,159 | A | 3/1998 | Kikinis |
| 5,727,202 | A | 3/1998 | Kucala |
| 5,760,716 | A | 6/1998 | Mathews et al. |
| 5,771,010 | A | 6/1998 | Masenas |
| 5,787,441 | A | 7/1998 | Beckhardt |
| 5,790,974 | A | 8/1998 | Tognazzini |
| 5,793,970 | A | 8/1998 | Fakes et al. |
| 5,802,312 | A | 9/1998 | Lazaridis et al. |
| 5,809,415 | A | 9/1998 | Rossmann |
| 5,841,376 | A | 11/1998 | Hayashi |
| 5,850,517 | A | 12/1998 | Verkler et al. |
| 5,857,201 | A | 1/1999 | Wright et al. |
| 5,870,610 | A | 2/1999 | Beyda |
| 5,875,329 | A | 2/1999 | Shan |
| 5,903,230 | A | 5/1999 | Masenas |
| 5,903,881 | A | 5/1999 | Schrader et al. |
| 5,930,471 | A | 7/1999 | Milewski et al. |
| 5,961,590 | A | 10/1999 | Mendez et al. |
| 5,974,238 | A | 10/1999 | Chase, Jr. |
| 5,987,464 | A | 11/1999 | Schneider |
| 5,999,947 | A | 12/1999 | Zollinger et al. |
| 6,003,089 | A | 12/1999 | Shaffer et al. |
| 6,006,274 | A | 12/1999 | Hawkins et al. |
| 6,023,708 | A | 2/2000 | Mendez et al. |
| 6,034,621 | A | 3/2000 | Kaufman |
| 6,049,671 | A | 4/2000 | Slivka et al. |
| 6,052,735 | A | 4/2000 | Ulrich et al. |
| 6,065,017 | A | 5/2000 | Barker |
| 6,104,392 | A | 8/2000 | Shaw et al. |
| 6,111,707 | A | 8/2000 | Buddecke et al. |
| 6,151,606 | A | 11/2000 | Mendez et al. |
| 6,151,708 | A * | 11/2000 | Pedrizetti ............. G06F 8/65 717/173 |
| 6,167,448 | A | 12/2000 | Hemphill |
| 6,182,117 | B1 | 1/2001 | Christie et al. |
| 6,216,157 | B1 | 4/2001 | Vishwanath et al. |
| 6,218,970 | B1 | 4/2001 | Jaquette |
| 6,219,694 | B1 | 4/2001 | Lazaridis et al. |
| 6,226,618 | B1 | 5/2001 | Downs |
| 6,257,848 | B1 | 7/2001 | Terauchi |
| 6,259,891 | B1 | 7/2001 | Allen |
| 6,275,848 | B1 | 8/2001 | Arnold |
| 6,279,001 | B1 | 8/2001 | DeBettencourt et al. |
| 6,304,881 | B1 | 10/2001 | Halim et al. |
| 6,308,061 | B1 | 10/2001 | Criss |
| 6,310,889 | B1 | 10/2001 | Parsons et al. |
| 6,330,618 | B1 | 12/2001 | Hawkins et al. |
| 6,341,316 | B1 * | 1/2002 | Kloba ............. G06F 17/30902 707/E17.12 |
| 6,343,299 | B1 | 1/2002 | Huang et al. |
| 6,347,340 | B1 | 2/2002 | Coelho et al. |
| 6,360,272 | B1 | 3/2002 | Lincke et al. |
| 6,381,454 | B1 | 4/2002 | Tiedemann |
| 6,384,850 | B1 | 5/2002 | McNally et al. |
| 6,393,434 | B1 | 5/2002 | Huang et al. |
| 6,396,482 | B1 | 5/2002 | Griffin et al. |
| 6,401,136 | B1 | 6/2002 | Britton et al. |
| 6,425,126 | B1 | 7/2002 | Branson |
| 6,430,601 | B1 | 8/2002 | Eldridge et al. |
| 6,434,613 | B1 | 8/2002 | Bertram et al. |
| 6,449,622 | B1 | 9/2002 | LaRue et al. |
| 6,457,062 | B1 | 9/2002 | Pivowar et al. |
| 6,460,055 | B1 | 10/2002 | Midgley et al. |
| 6,463,463 | B1 | 10/2002 | Godfrey et al. |
| 6,463,464 | B1 | 10/2002 | Lazaridis et al. |
| 6,477,543 | B1 | 11/2002 | Huang et al. |
| 6,496,979 | B1 | 12/2002 | Chen |
| 6,505,055 | B1 | 1/2003 | Kahn et al. |
| 6,535,892 | B2 | 3/2003 | LaRue et al. |
| 6,571,245 | B2 | 5/2003 | Huang et al. |
| 6,604,236 | B1 | 8/2003 | Draper et al. |
| 6,615,253 | B1 | 9/2003 | Bowman-Amuah |
| 6,625,621 | B2 | 9/2003 | Tan et al. |
| 6,636,873 | B1 | 10/2003 | Carini et al. |
| 6,640,244 | B1 | 10/2003 | Bowman-Amuah |
| 6,654,746 | B1 | 11/2003 | Wong et al. |
| 6,658,167 | B1 | 12/2003 | Lee et al. |
| 6,671,757 | B1 | 12/2003 | Multer et al. |
| 6,675,009 | B1 | 1/2004 | Cook |
| 6,694,335 | B1 | 2/2004 | Hopmann et al. |
| 6,697,458 | B1 | 2/2004 | Kunjibettu |
| 6,701,378 | B1 | 3/2004 | Gilhuly et al. |
| 6,721,019 | B2 | 4/2004 | Kono et al. |
| 6,721,288 | B1 * | 4/2004 | King ............. H04L 29/06 370/310 |
| 6,721,787 | B1 | 4/2004 | Hiscock |
| 6,721,871 | B2 | 4/2004 | Piispanen et al. |
| 6,735,434 | B2 | 5/2004 | Criss et al. |
| 6,757,698 | B2 | 6/2004 | McBride et al. |
| 6,779,019 | B1 | 8/2004 | Mousseau et al. |
| 6,792,085 | B1 | 9/2004 | Rigaldies et al. |
| 6,829,639 | B1 | 12/2004 | Lawson et al. |
| 6,874,037 | B1 | 3/2005 | Abram et al. |
| 6,901,415 | B2 | 5/2005 | Thomas et al. |
| 6,907,243 | B1 | 6/2005 | Patel |
| 6,931,454 | B2 | 8/2005 | Deshpande et al. |
| 6,934,766 | B1 | 8/2005 | Russell |
| 6,941,348 | B2 | 9/2005 | Petry et al. |
| 6,941,349 | B2 | 9/2005 | Godfrey et al. |
| 6,954,789 | B2 | 10/2005 | Dietz et al. |
| 6,973,299 | B2 | 12/2005 | Apfel |
| 6,976,263 | B2 | 12/2005 | Delaney |
| 6,983,308 | B1 | 1/2006 | Oberhaus |
| 7,003,776 | B2 | 2/2006 | Sutherland |
| 7,016,944 | B1 | 3/2006 | Meyer et al. |
| 7,073,137 | B2 | 7/2006 | Hassanin |
| 7,085,809 | B2 | 8/2006 | Mori et al. |
| 7,092,699 | B1 | 8/2006 | Hefter |
| 7,133,756 | B2 | 11/2006 | Jammu |
| 7,136,934 | B2 | 11/2006 | Carter et al. |
| 7,139,555 | B2 | 11/2006 | Apfel |
| 7,149,813 | B2 | 12/2006 | Flanagin et al. |
| 7,155,483 | B1 | 12/2006 | Friend et al. |
| 7,185,082 | B1 | 2/2007 | del Val et al. |
| 7,239,877 | B2 | 7/2007 | Corneille et al. |
| 7,257,649 | B2 | 8/2007 | Rabbers et al. |
| 7,340,389 | B2 | 3/2008 | Vargas |
| 7,356,510 | B2 | 4/2008 | Durand |
| 7,467,167 | B2 | 12/2008 | Patterson |
| 8,178,040 | B2 | 5/2012 | Brauer |
| 8,875,116 | B2 | 10/2014 | O'Neill et al. |
| 2001/0004744 | A1 | 6/2001 | Lazaridis et al. |
| 2001/0005864 | A1 | 6/2001 | Mousseau et al. |
| 2001/0010059 | A1 | 7/2001 | Burman et al. |
| 2001/0029178 | A1 | 10/2001 | Criss |
| 2001/0034654 | A1 | 10/2001 | Vigil |
| 2001/0044835 | A1 | 11/2001 | Schober et al. |
| 2001/0046854 | A1 | 11/2001 | Henry |
| 2001/0049263 | A1 | 12/2001 | Zhang |
| 2001/0053688 | A1 | 12/2001 | Rignell |
| 2001/0054115 | A1 | 12/2001 | Ferguson et al. |
| 2002/0013853 | A1 | 1/2002 | Baber et al. |
| 2002/0019225 | A1 | 2/2002 | Miyashita |
| 2002/0032722 | A1 | 3/2002 | Baynes et al. |
| 2002/0046286 | A1 | 4/2002 | Caldwell et al. |
| 2002/0055355 | A1 | 5/2002 | Ikeda |
| 2002/0083157 | A1 * | 6/2002 | Sekiguchi ............. H04L 12/1859 709/219 |
| 2002/0085506 | A1 | 7/2002 | Hundscheidt |
| 2002/0085719 | A1 | 7/2002 | Crosbie |
| 2002/0099772 | A1 | 7/2002 | Deshpande |
| 2002/0119793 | A1 | 8/2002 | Hronek |

(56) References Cited

U.S. PATENT DOCUMENTS

| | | |
|---|---|---|
| 2002/0120696 A1 | 8/2002 | Mousseau et al. |
| 2002/0146240 A1 | 10/2002 | Ogawa et al. |
| 2002/0155829 A1 | 10/2002 | Proctor |
| 2002/0160773 A1 | 10/2002 | Gresham et al. |
| 2002/0169745 A1* | 11/2002 | Hotti ............... G06F 17/30292 |
| 2003/0022661 A1 | 1/2003 | Guterman |
| 2003/0046434 A1 | 3/2003 | Flanagin et al. |
| 2003/0050046 A1* | 3/2003 | Conneely ............. H04L 12/587 455/412.1 |
| 2003/0055977 A1* | 3/2003 | Miller .................... H04L 29/06 709/227 |
| 2003/0069842 A1 | 4/2003 | Kight |
| 2003/0072451 A1* | 4/2003 | Pimentel ................ H04L 63/08 380/270 |
| 2003/0081621 A1 | 5/2003 | Godfrey et al. |
| 2003/0084165 A1 | 5/2003 | Kjellber |
| 2003/0097381 A1 | 5/2003 | Detweiler |
| 2003/0097490 A1 | 5/2003 | Delaney |
| 2003/0143991 A1 | 7/2003 | Minear |
| 2003/0147369 A1 | 8/2003 | Singh |
| 2003/0182326 A1 | 9/2003 | Patterson |
| 2004/0002943 A1 | 1/2004 | Merrill |
| 2004/0003266 A1 | 1/2004 | Moshir |
| 2004/0034853 A1 | 2/2004 | Gibbons |
| 2004/0054739 A1 | 3/2004 | Friend et al. |
| 2004/0068665 A1 | 4/2004 | Fox |
| 2004/0092255 A1 | 5/2004 | Ji |
| 2004/0098421 A1 | 5/2004 | Peng |
| 2004/0098715 A1 | 5/2004 | Aghera |
| 2004/0105423 A1 | 6/2004 | Koehler et al. |
| 2004/0109436 A1 | 6/2004 | Vargas et al. |
| 2004/0203693 A1 | 10/2004 | Mehta |
| 2004/0203941 A1 | 10/2004 | Kaplan |
| 2004/0214599 A1 | 10/2004 | Ogino |
| 2004/0246895 A1 | 12/2004 | Feyerabend |
| 2005/0075115 A1 | 4/2005 | Corneille |
| 2005/0132357 A1 | 6/2005 | Shell |
| 2005/0148356 A1 | 7/2005 | Ferguson et al. |
| 2005/0186952 A1 | 8/2005 | Kitajima |
| 2005/0216534 A1 | 9/2005 | Ikezawa |
| 2005/0254458 A1 | 11/2005 | Proctor |
| 2006/0025123 A1 | 2/2006 | Majmundar |
| 2006/0046703 A1 | 3/2006 | Liu |
| 2006/0073820 A1 | 4/2006 | Craswell et al. |
| 2006/0106806 A1 | 5/2006 | Sperling |
| 2006/0129638 A1 | 6/2006 | Deakin |
| 2006/0206537 A1 | 9/2006 | Chiang |
| 2006/0217111 A1 | 9/2006 | Marolia |
| 2006/0229027 A1 | 10/2006 | Wang |
| 2006/0242621 A1 | 10/2006 | Ye |
| 2007/0042766 A1 | 2/2007 | Herle |
| 2007/0083676 A1 | 4/2007 | Rabbers |
| 2008/0125105 A1 | 5/2008 | Qumei |
| 2009/0013083 A9 | 1/2009 | Garcia-Luna-Aceves |
| 2009/0013089 A1 | 1/2009 | Sullivan et al. |

FOREIGN PATENT DOCUMENTS

| | | |
|---|---|---|
| EP | 0909037 A1 | 4/1999 |
| EP | 0917077 A2 | 5/1999 |
| EP | 1014629 A2 | 6/2000 |
| JP | 07-182263 | 7/1995 |
| JP | 10-269125 | 10/1998 |
| JP | 11-136365 | 5/1999 |
| JP | 2000148641 | 5/2000 |
| JP | 2001053785 | 2/2001 |
| JP | 2001076040 | 3/2001 |
| WO | 0067158 | 11/2000 |
| WO | 0219626 A2 | 3/2002 |

OTHER PUBLICATIONS

Airsoft, Inc., 1996, Powerburst: making remote access work, 9 pp.
Airsoft, Inc., Dec. 1995, Corporate Backgrounder, 5 pp.
Airsoft, Inc., Jun. 21, 1994, AirSoft AirAccess 2.0 Mobile Networking Software: Product Overview and Reviewer's Guide, 11 pp.
Anterior Technology Radiomail Gateway Services, Dec. 1991, Draft Application Program Interface Specification, Version 1.0 (Beta), 7 pp.
Barnstijn: Memo re MailCall and Radiomail integration, Research in Motion, 7 pp, Dec. 6, 1991.
Berners-Lee et al: Hypertext Transfer Protocol—HTTP/1.0, 60 pp, May 1996.
Business Wire, SkyTel and CompuServe team to provide wireless messaging services in countries worldwide; SkyTel adds to e-mail connectivity options it provides for business markets, 3 pp, May 1, 1991.
cc:Mail Inc., 1995, Lotus cc:Mail for the World Wide Web Release 1 Administrator's Guide, 44 pp.
cc:Mail Inc., 1994, Automatic Directory Exchange Release 2: Administrator's Guide, 76 pp.
CompuServe Incorporated, 1988, CompuServe Professional Connection Plus Message Management with Forms, Users Guide, 131 pp.
Crispin: RFC1730—Internet message access protocol—Version 4, Network Working Group, University of Washington, 55 pp. Dec. 1994.
Crocker: RFC 822—Standard for the format of ARPA internet text messages, 43 pp, 1982.
Dahl, Andrew: Lotus Notes 4 Administrator's Survival Guide, Sams Publishing, pp. 49, 64-66, 1996.
Data Communications, Juicing up remote-node links to the LAN, pp. 108 and 110, Nov. 1996.
DeveloperWorks Lotus, Web team, IBM,The History of Notes and Domino, 22 pp., Nov. 14, 2007.
GloMop Group, GloMop: Global Mobile Computing by Proxy, 12 pp., Sep. 13, 1995.
Grous, Paul: Creating gand Managing a Web Site with Lotus' InterNotes Web Publisher, The View, 17 pp., Sep./Oct. 1995.
Infinite Technologies, Administrator's Guide: WebMail Remote e-mail access via the world wide web, Release 1.0, 72 pp., 1996.
Infinite Technologies, User's Guide: Webmail Remote Email Access, 82 pp., 1996.
Infinite Technologies, WebMail Q&A, 5pp., Sep. 27, 1995.
Infinite Technologies, Infinite InterChange: Remote access to almost any LAN-based e-mail from anywhere, 93pp.
Infinite Technologies, Infinite InterChange: remote access to almost any LAN-based e-mail from anywhere, 1 p., 1997.
Infinite Technologies, Introducing WebMail Presentation, 13 pp., 1997.
InfoKomp, WebMail Tech Notes: FY1s, 5 pp., Jan. 11, 1996.
Internet Anywhere Consortium, Business Plan of Jul. 1, 1994, Information Technology Research Centre, Mortice Kern Systems Inc., Research in Motion Limited, 48 pp.
Internet Anywhere Consortium, Program Budget and Statement of Work, Information Technology Research Centre, Mortice Kern Systems Inc. Research in Motion Limited, 12 pp., Feb. 21, 1994.
Internet Anywhere Wireless Functional Specification, Research in Motion, Limited, 9 pp., Jun. 27, 1994.
Kramer: Remote possibilities; gateways let remote users exchange mail via web browsers, 5 pp., 1996.
Kucharczyk, David: Memo re MailCall and Radiomail Integration, Research in Motion, 2 pp., Dec. 11, 1991.
Lamb et al.: Lotus Notes Network Design for Notes Release 3 and 4, McGraw-Hill, pp. 196-197, 1996.
Lambert: PCMAIL: A distributed mail system for personal computers, 37 pp., 1988.
Lazaridis: Viking Express document to Richard Kirby, 2pp., Jan. 23, 1992.
Libris Inc: Libris AirNet Service, Specification Version 0.6b, 172 pp., Sep. 1995.
Lotus Development, Lotus Notes Release 4.5 Administrator's Guide, 374 pp., 1995.
MailCall Specification Rev. 1, Demonstration Document, 6 pp., Oct. 21, 1991.

(56) References Cited

OTHER PUBLICATIONS

Mathers et al: Lotus Notes Internet Cookbook for Notes Release 4, 37 pp., Feb. 14, 1996.
MKS Internet Anywhere Product Plan, 7.2.3 Release Schedule, 2 pp., 1994.
Mobilib-Plus Developers Kit: User Guide and Reference Manual, Version 2.2, Research in Motion Ltd., 80 pp. Jun. 28, 1993.
MobilLib-Plus Product Brief: Preliminary interface specification for MobiLib-Plus session layer, Research in Motion Limited, 8 pp., Sep. 24, 1991.
Mobitex User's Handbook for the Mobiden AT, Version 1.0, Research in Motion, 66 pp., Apr. 1993.
Motorola Inc., Communication Client Guide: AirMobile Wireless Software for Lotus cc:Mail, 48 pp., 1995.
Motorola, AirMobile wireless software for cc:mail: e-mail from anywhere, 2 pp., 1995.
Motorola, Communication Server Guide: AirMobile Wireless Software for Lotus cc:Mail, 46 pp., 1995.
Pyle: A jump start for the top ten R3-toR4 migration consideration, The View, Wellesley Information Services, pp. 3-20, Nov.-Dec. 1995.
RAM Mobile Data, Inc., An Overview of the Ram Mobile Data, Inc. Mobitex Packet Radio Networks including a summary of radio/modem and terminal design requirements and guidelines for application specific software design, Issue 2, 61 pp., Aug. 1990.
Rennie: The Official Guide to Lotus Software: cc:Mail Plain and Simple, Sybex Inc., 293 pp., 1994.
Research in Motion Limited, Wireless Access to the Internet-Preliminary Functional Specification, 12 pp., 1994.
RIM/MKS/ITRC CANARIE Partnership: INTERNET Anywhere Wireless Access to the INTERNET; PowerPoint slide, 1 pg.
Wong: Casahl's replic-action: delivering true notes/DMBS integration, The View, pp. 33-50, Jan./Feb. 1996.
"Rarlabs Download Page", http://web.archive.org/web/20020603234419/http://www.rarlab.com/download.htm, Capture by Wayback Machine on Jun. 3, 2002, (1 pg.).
International Search Report mailed Jul. 28, 2003 issued on related application PCT/US2003/012799, filed Apr. 23, 2003.

\* cited by examiner

INFORMATION REPOSITORY SYSTEM INCLUDING A WIRELESS DEVICE AND RELATED METHOD

CROSS-REFERENCE TO RELATED APPLICATIONS

This application is a continuation under 35 U.S.C. §120 of U.S. patent application Ser. No. 10/171,048, filed Jun. 12, 2002, the contents of which are incorporated herein by reference in their entirety.

BACKGROUND OF THE INVENTION

The present invention relates generally to wireless communications, and more particularly to a system and method for updating a wireless device.

A variety of businesses have embraced wireless solutions. Enterprise workforces are increasingly mobile and accordingly require access to time-critical data while away from the office. Further, increased globalization and competition requires companies to be more accessible and responsible. Using wireless-enabled "smart devices," mobile workers can make more efficient use of their out-of-office time, thus producing cost savings. Similarly, real-time responsiveness to customer requests may differentiate one enterprise from a competitor, resulting in greater revenue via increased customer sales. Wireless technology provides flexibility with respect to time and place of work to workers in today's market.

Due to the numerous advantages outlined above, wireless technology has been rapidly adopted by enterprises. Increasingly, wireless devices can provide mobile professionals access to all corporate resources and applications that are already available to them on desktops. However, handheld wireless device and network limitations can make those applications and resources difficult to access and use. Further, mobile professionals and companies for which they work constantly add to and modify data on their fixed computing devices with data from the device, and vice versa. Solutions involving synching require manual updating via a desktop cradle or wireless modem, relying on user intervention. Persistently synching devices at a workstation in order to receive updates to critical data is time consuming and not cost effective. Thus, a system and method are needed for updating a wireless device in a time-efficient manner with little or no user intervention required.

SUMMARY

The present invention provides in various embodiments an information repository system including a wireless device, and related method.

In a system according to one embodiment of the present invention, an information repository system is provided. The information repository system comprises a wireless device configured to receive a first version of information from a server, where the first version of information has a first unique identifier associated therewith. The information repository system further comprises an information repository configured to store the first version of information having the first unique identifier, and configured to store a second version of the information having the first unique identifier, where the second version of information overwrites the first version of information.

In a method according to another embodiment of the present invention, the method facilitates repositing information on a wireless device coupled to a server. The method comprises receiving, at a wireless device, a first version of information from a server, where the first version of information has a first unique identifier associated therewith. Next, the first version of information having the first unique identifier is stored in an information repository. Further, a second version of the information having the first unique identifier is also stored in the information repository, where the second version of information overwrites the first version of information.

A further understanding of the nature and advantages of the inventions herein may be realized by reference to the remaining portions of the specification and the attached drawings.

DETAILED DESCRIPTION OF CERTAIN INVENTIVE EMBODIMENTS

Figure 1:
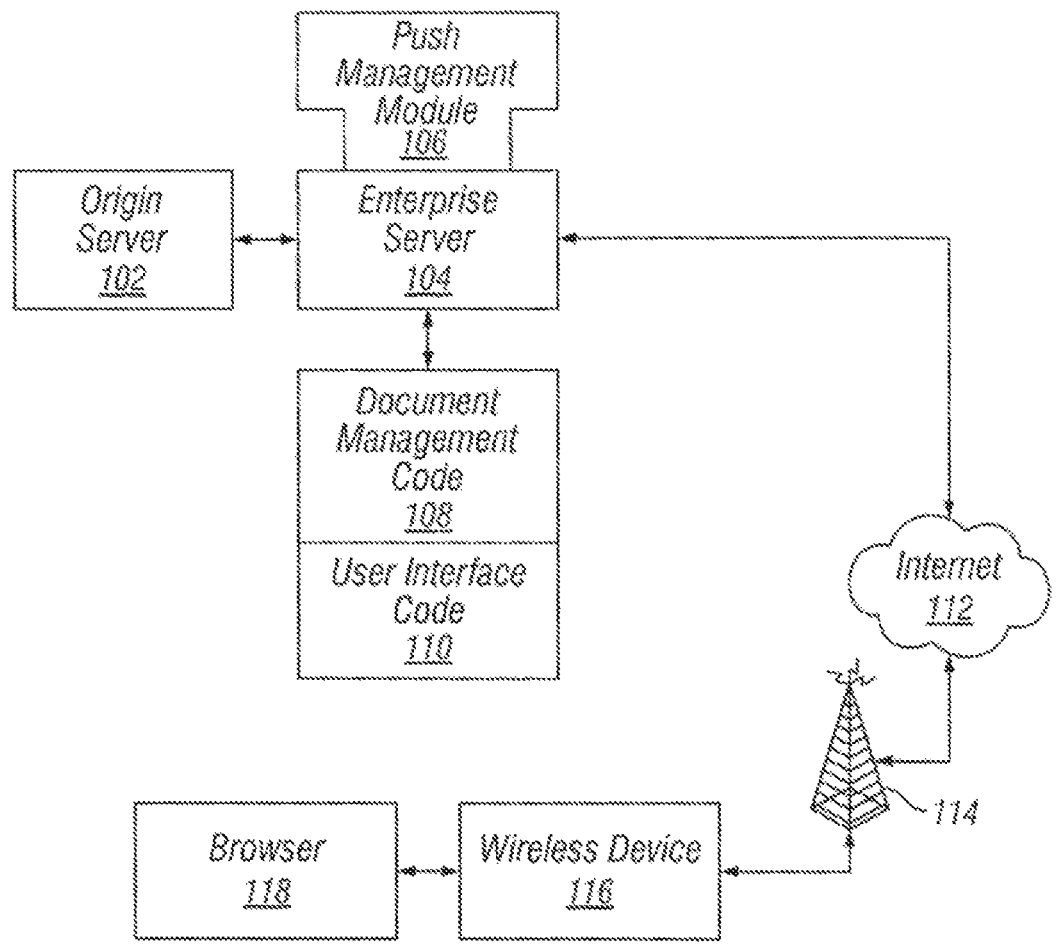
FIG. 1 is a schematic drawing of an exemplary architecture, in accordance with an embodiment of the present invention.

As shown in the exemplary drawings wherein like reference numerals indicate like or corresponding elements among the figures, an embodiment of a system according to the present invention will now be described in detail. The following description sets forth an example of a system and method for updating a wireless device.

Detailed descriptions of various embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, method, process or manner.

Wireless devices are widely used in today's world. Accordingly, there is a need for a variety of wireless solutions. The present system solves the problem of constantly synching one's wireless device with their fixed computing device by automatically forwarding information related to a change(s), such as an addition, a deletion, or any other modification to folders, subfolders, files etc., at the fixed computing device. Accordingly, a user can expect his or her wireless device to automatically be updated utilizing the system and method of the present invention.

One way the present system fulfills current needs is by adding push support to enterprise applications. Information related to updates is automatically pushed to users' wireless devices. Accordingly, workers are provided with up-to-date information without having to incessantly seek out such information. The present invention eliminates the need for manual synching, and assures that information is sent and received transparently.

Referring now to the drawings, FIG. 1 is a schematic drawing of an exemplary architecture in accordance with an embodiment of the present invention. In the example, origin server 102 is coupled to enterprise server 104 to allow for the exchange(s) of data between the two servers. Enterprise server 104 is coupled to push management module (PMM) 106, document management code module 108, and user interface code module 110. Further, data from enterprise server 104 may be forwarded to wireless device 116 via transmission medium 114 by way of a wide area network, such as Internet 112, as shown. Wireless device 116 includes browser 118. A wireless device may include any wireless device that communicates via a wireless network, such as a Palm Pilot™, a "smart phone," a RIM™ device, etc. In one embodiment, wireless device 116 may be a portable wireless device. It is also contemplated that in alternative embodiments, other devices that may or may not be wireless may be used in accordance with embodiments of the present invention.

Enterprise server 104 may be representative of a server computer in an enterprise environment. For example, a corporation may provide wireless services to 10 its employees utilizing the present system, including enterprise server 104. In an exemplary embodiment of the present invention, enterprise server 104 resides behind a corporate firewall to ensure the secure transmission of data.

Origin server 102 may represent any source of information external to a company hosting enterprise server 104 or internal to a company hosting enterprise 15, server 104. Although origin server 102 is not requisite, such a server is often coupled to a company's enterprise server to provide information.

Enterprise server 104 is coupled to origin server 102 in the example shown to facilitate data exchange(s). However, enterprise server 104 may be coupled to any type of source suitable for use with the present system. Further, enterprise server 104 may serve as the primary origin of data, in which case it may not be coupled to any type of source server at all.

PMM 106 may represent a plug-in application, a general application program, or any other component of enterprise server 104 suitable for use with the present system. PMM 106 is software that attaches/plugs-in to enterprise server 104 to provide basic push capabilities. PMM 106 makes it possible for an application to send secure messages to wireless device 116 without waiting for a user to send a request. Accordingly, useful information can be sent to the user's wireless device 116 in advance of when the information is needed or requested. Thus, when the user needs the information, the information is already present. Accordingly, no time is lost in sending a request (e.g., a hypertext transfer protocol (HTTP) request, etc.) from wireless device 116 to enterprise server 104 and waiting for data to return to wireless device 116. Further, the data on the user's wireless device 116 is the most up-to-date information available.

Document management code module 108 may also be a plug-in application, a general application program, firmware, or any other component associated with enterprise server 104 that is suitable for use with the present system. Document management code 108 communicates with PMM 106 in an exemplary embodiment according to the present invention.

PMM 106 may communicate the information to enterprise server 104 while providing an alert that information is being forwarded. Information can include documents, alerts or any other type of information suitable for use with the present system. For example, new files, deleted files, change(s) to files, directories, set of files, etc. Another such example is applications. The information may be forwarded to the server without any type of alert. Thus, the information can be sent transparently.

Further, the information may be sent as an alert to wireless device 116. Therefore, when the information arrives at the user's wireless device 116, the user is notified of its arrival. In one embodiment, in a similar way a user is notified of an electronic mail (E-mail) message. For example, if wireless device 116 is configured to beep three times for E-mail, it can do the same when information with an alert arrives. A notification may also be displayed on a screen of wireless device 116 when the information arrives. However, if no alert accompanies the information, the information can be saved as a message for viewing at a later time, but the user is not immediately notified of the arrival of the information (document, etc.) in this embodiment.

In an exemplary embodiment according to the present invention, user interface code module 110 is an application on enterprise server 104. However, user interface code module 110 may be an application residing elsewhere provided module 110 is coupled to enterprise server 104 via a network. For example, user interface code module 110 may reside on a user computer, a separate computer associated with the user such as a computer of an information technology (IT) manager, etc. As will be discussed in further detail, the user can modify existing files, add files, etc. utilizing user interface code module 110.

Utilizing enterprise server 104, PMM 106 forwards information to wireless device 116 via Internet 112, or another suitable network, by way of wireless transmission medium 114. PMM 106 can check for network connectivity and will transmit the information to wireless device 116 by way of enterprise server 104 when a connection is secured.

An exemplary system and method utilizing the architecture described herein will now be discussed. In a system and method according to one embodiment of the present invention, it is determined whether one or more changes have occurred to a set of files. The set of files may include a file system and/or a directory structure. The set of files may reside on a server, a user computer, and/or a separate computer associated with the user (e.g., a computer of a manager of the user company, etc.). The one or more changes to the set of files may include adding a file to the set of files, deleting a file from the set of files, modifying a file in the set of files, or changing the set of files themselves, such as by renaming a file, etc. The set of files includes one or more files. Information related to the one or more changes is received and automatically forwarded to wireless device 116. In one embodiment, a unique identifier is assigned to the information related to the one or more changes. Further, the information associated with the one or more changes can be manipulated. One or more files on wireless device 116 are automatically updated to reflect the one or more changes in the set of files utilizing the information. One specific exemplary implementation of such functionality will be set forth with reference to FIG. 4. In one embodiment, a notification of the one or more changes is forwarded to wireless device 116.

In another embodiment, the set of files are periodically accessed in order to determine whether the one or more changes to the set of files has occurred. In another embodiment, it may be determined whether the one or more changes to the set of files is related to a predetermined group associated with the set of files (e.g., sales division, engineering department, etc.). The information associated with the one or more changes can then be conditionally forwarded to the wireless device based on the predetermined group (e.g., technical specifications are only forwarded to users that are part of the engineering department).

As discussed herein, the change(s) may include, inter alia, modifying the one or more files in the set of files, in which case the modified file can be re-pushed to wireless device 116 with the same unique identifier (such as a global unique identifier (GUID), etc.). The modified file may essentially overwrite the previously un-modified file. Thus, the modifications to the one or more files essentially creates a new file that replaces the one or more existing files.

Notification of the change(s), or any other type of change(s), may be forwarded to enterprise server 104. Further, notification of the change(s) and the update associated with the change(s) may be forwarded to the user via wireless device 116 associated with the user, or any other user interface, such as a computing device of the IT manager, etc. Enterprise server 104 and/or the user may register with the set of, files to be notified of a change(s) to the set of files. In one embodiment, enterprise server 104 periodically accesses the set of files in order to determine whether a change(s) to the one or more files in the directory has occurred. In an alternative embodiment, enterprise server 104 is adapted for manipulating the information associated with the change(s), such as processing the information by changing its configuration, adding headers to the information, or any other type of manipulation of the information that may be suitable. In another embodiment, one or more modules are associated with enterprise server 104 for manipulating the information.

As discussed herein, a unique identifier (e.g., GUID, etc.) may be assigned with the information associated with the change(s). Assignment of a unique identifier may be done for tracking purposes, for example. As noted, a new unique identifier may be associated with a new or existing file, or an existing unique identifier may continue to be associated with an existing file, even though the existing file may be modified and replaced by the modified file.

Figure 2:
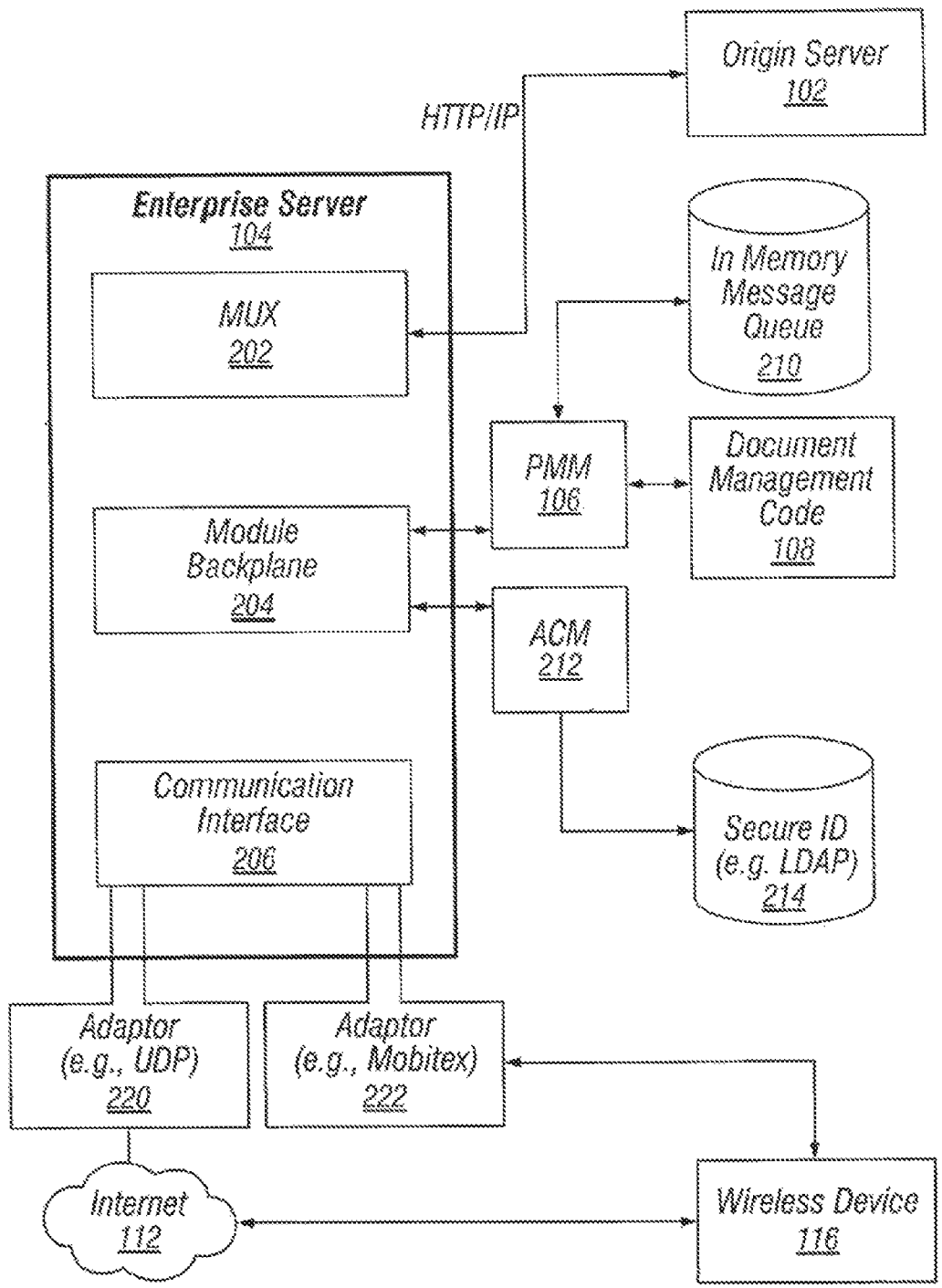
FIG. 2 is a schematic diagram illustrating an exemplary architecture of an enterprise server in relation to other elements that may be associated therewith, in accordance with an embodiment of the present invention.

In further keeping with some embodiments according to the present invention, FIG. 2 is a schematic diagram illustrating exemplary architecture of enterprise server 104 in relation to other elements that may be associated therewith. As previously discussed, enterprise server 104 may be connected to origin server 102, as well as PMM 106.

Enterprise server 104 may include multiplexer (MUX) module 202 for multiplexing data signals. Module platform 204 and communication interface module 206 may also be included as part of enterprise server 104. Module platform 204 may be connected to various additional modules. In FIG. 2, PMM 106 and Access Control Module (ACM) 212 are illustrated as examples of modules that may be connected to module backplane 204 of enterprise server 104. ACM 212 controls what areas of an application/web site are accessible by what users. The modules may include databases associated therewith, such as databases 210 and 214 indicated in FIG. 2. An example of Secure ID database 214 may include Lightweight Directory Access Protocol (LDAP), for example. As discussed herein, PMM 106 may be responsible for notifying document management code module 108 of a change(s) to the set of files.

Communications interface module 206 may include and/or be coupled to adaptor 222 for communicating with wireless device 116. An example of such an adaptor is commonly known as "Mobitex." Communication to wireless device 116 may be accomplished utilizing another type of adaptor, such as user datagram protocol (UDP) 220 via the Internet 112, utilizing Internet protocol (IP), or by any other suitable means.

MUX module 202 may represent a hard-wired module with direct connectivity to some type of source, such as origin server 102 shown in FIG. 2. Further, information flows to and from MUX module 202 from communication interface 206 and may be manipulated by module backplane 204, which may include various modules, as discussed herein.

PMM 106 monitors communications via ports of wireless device 116. Information may be pushed from document management code module 108 to wireless device 116 via PMM 106 and enterprise server 104. Conversely, wireless device 116 may provide information to user interface code module 110 via document management code module 108, which may receive the information from enterprise server 104 via PMM 106.

Document management code module 108 is capable of communicating with any PMM 106. For example, PMM 106 of a server other than enterprise server 104 may receive communications from document management code module 108.

In one embodiment, the set of files includes~file system that in turn includes one or more directory structures. The directory structures can be created either on enterprise server 104 directly, or via user interface code module 110. The directory structures may include a hierarchical structure, including folders, subfolders, etc. For example, a form library may be organized utilizing the directory structure(s). When a user adds to, deletes, or otherwise modifies files within the directory structure(s), the activity is communicated to document management code module 108. Document management code module 108 may utilize PMM 106 to provide an alert associated with information relating to the addition and/or modification, or the information may be transmitted transparently, without using an alert. PMM 106 forwards the information to enterprise server 104, which sends the updated information to a wireless device of the user, such as wireless device 116. Browser 118 on wireless device 116 monitors communications related to the information. Accordingly, one or more files on wireless device 116 are automatically updated with the information that has been pushed to wireless device 116 via enterprise server 104.

Figure 3:
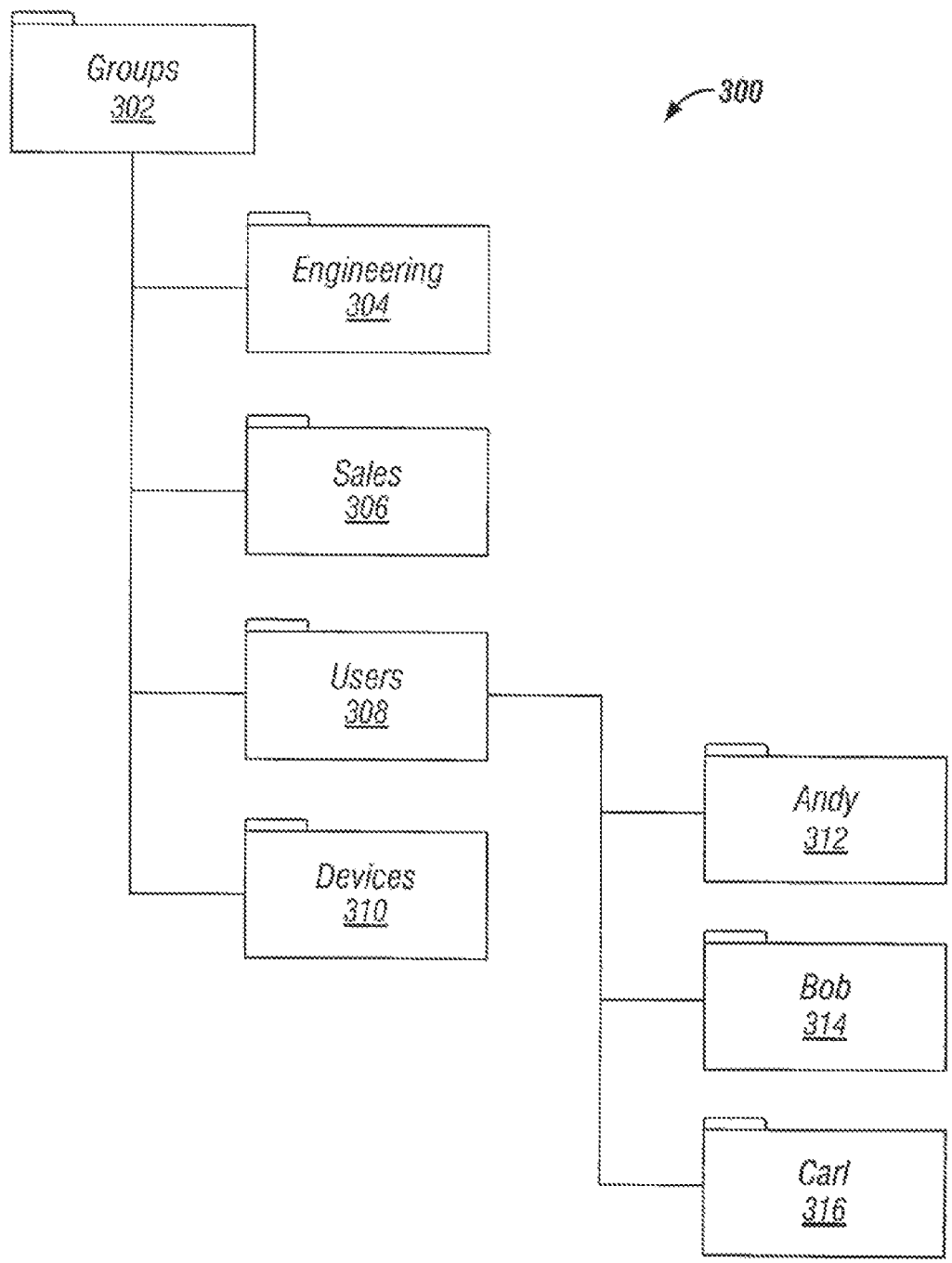
FIG. 3 is a schematic diagram of an exemplary directory structure, in accordance with an embodiment of the present invention.

Referring now to FIG. 3, an exemplary directory structure 300 is illustrated in accordance with an embodiment of the present invention. As indicated in FIG. 3, group's folder 302 may include various subfolders, such as engineering subfolder 304, sales subfolder 306, users subfolder 308 and devices subfolder 310. Groups folder 302 may include subfolders further including predetermined groups, for example, as discussed herein. FIG. 3 also illustrates that the subfolders 304, 306, 308 and 310 may include further subfolders. For example, the users folder 308 may include folders for Andy 312, Bob 314 and Carl 316. The folders may include user lists for forwarding updated information to users on the list. Various other folders and subfolders may be included. As another example, a subfolder labeled "All" may be included, the subfolder including files pertaining to all users. In a typical user interface environment, a user may drag and drop a file from one folder to the next, or from an outside source into a folder within directory structure 300. A user may also drag and drop folders and subfolders. When such a folder is moved or added, or a file within directory structure 300 is otherwise modified, the information is transmitted to one or more wireless devices, such as wireless device 116, associated with the user in order to update the one or more wireless devices.

Each folder has associated with it a set of wireless devices 116 that will receive updates. This association is stored in a configuration file or database. In one embodiment, as long as the association is maintained, changing the name of a directory does not need to change which wireless devices 116 are associated with which directory. Often, however, the interface code will maintain logical mapping between the folder names and which wireless devices 116 the folder is associated with. For example, the user name might be the same as the folder name. In that case, if the folder name changes then the folder would be associated with a different user name. This kind of mapping is not necessary, however.

As discussed herein, a set of files may include a file system and/or directory structure, such as directory structure 300. Generally, file systems and directory structures represent user interaction modes. Any mode of user interaction suitable for use with the present system may be employed. For example, a web interface, file transfer protocol (FTP) interface, a machine-to-machine interface, such as simple object access protocol (SOAP), etc., may also be utilized to enable user interaction.

Figure 4:
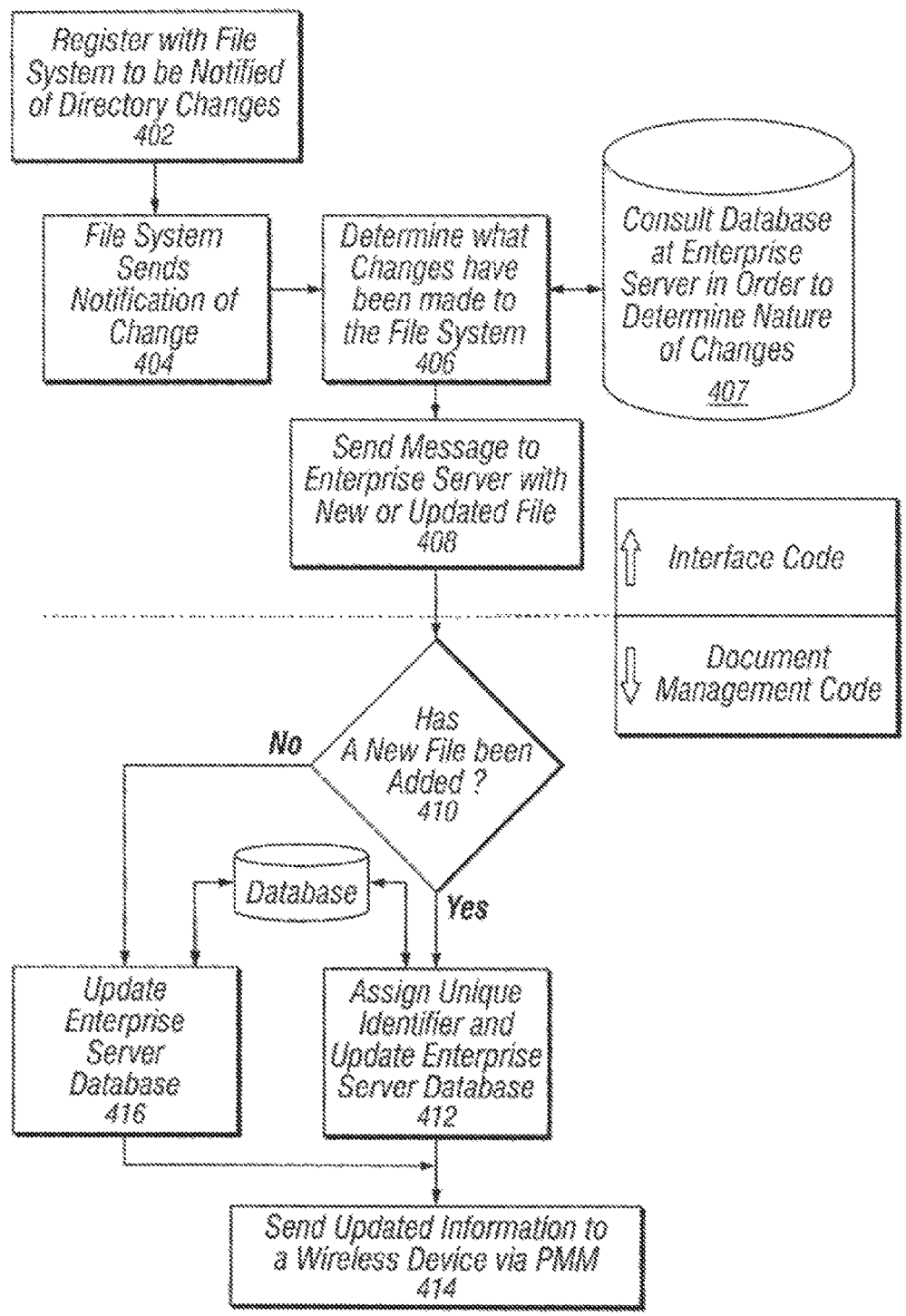
FIG. 4 is a flowchart illustrating an exemplary process for identifying a change(s) to the file system.

In order to update wireless device 116 of the user, the nature of the change(s) to the set of files is determined. FIG. 4 illustrates how a change(s) to one or more files in directory structure 300 associated with a file system on enterprise server 104 are determined. In FIG. 4, the illustration exemplifies a set of files that includes a file system, the file system creating a directory structure, referred to simply as a directory in FIG. 4. A flowchart illustrating a process for identifying a change(s) to the one or more files in the directory in accordance with an embodiment of the present invention is shown.

At step 402, the user registers with the file system, via a user interface, such as user interface code module 110, to be notified of a change(s). At step 404, the file system sends notification of a change(s) to the one or more files in directory structure 300. At step 406, user interface code module 110 determines what change(s) has occurred to directory structure 300 by consulting database 407. At step 408, a message is sent to the server with the new or updated file information. At step 410, it is determined whether a new file was added. If a new file was added, a unique identifier is assigned and the database is updated therewith at step 412.' The updated information is forwarded to the device via PMM 106, or any other suitable push mechanism, at step 414. If a new file was not added, the database is updated with the information associated with the change(s) at step 416, and the information is forwarded to wireless device 116 at step 414.

The process described above is a notification process. Thus, when a user makes a change(s) that affects directory structure 300, the file system notifies enterprise server 104 of the change(s). This alert indicates to enterprise server 104 that action can be taken in response to the change(s). In other words, enterprise server 104 can determine the nature of the change(s) that occurred and forward the change(s) to wireless device 116 of the user.

Figure 5:
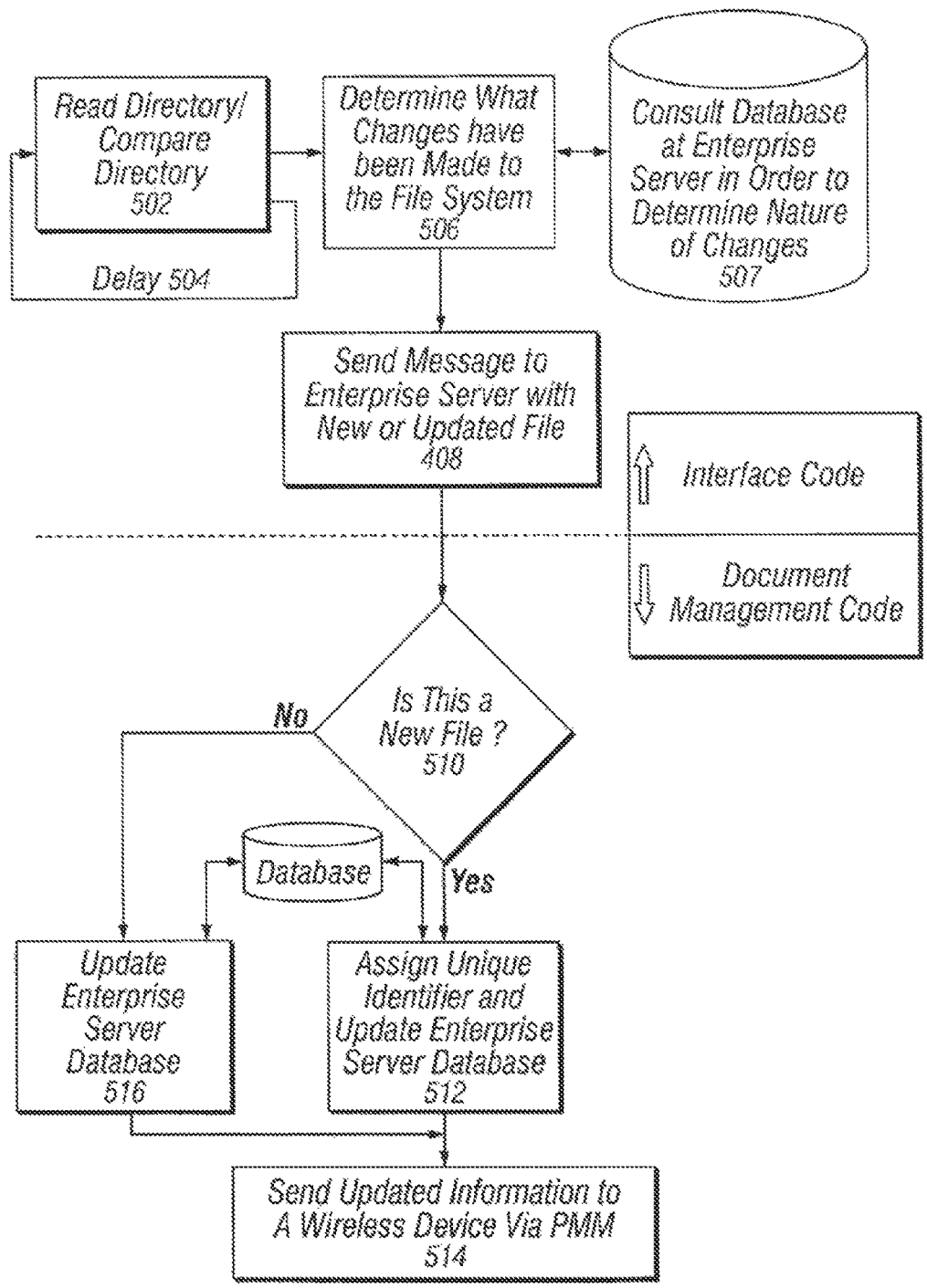
FIG. 5 is a flowchart illustrating an alternative exemplary process for monitoring a file system change(s).

FIG. 5 is a flowchart illustrating an alternative process for monitoring a change(s) to a set of files in accordance with an embodiment of the present invention. At step 502, enterprise server 104 periodically reads directory structure 300 associated with the file system. A delay results at step 504, which may be scheduled. The delay may be shortened or lengthened to adjust the frequency with which the directory is accessed. At step 506, directory structure 300 is checked for a change(s) that may have occurred since the previous time directory structure 300 was read. Database 507 may be accessed during this step to determine the nature of any change(s) that may have occurred. As in FIG. 4, it is determined whether a new file was added at step 510. If a new file was added, a unique identifier is assigned and the database is updated at step 512. The information associated with the new file is forwarded to wireless device 116 at step 514, via PMM 106 or any other suitable push mechanism. If the change(s) does not include the addition of a new file to the file system, the database is updated with the change(s) at step 516 and the information is sent to wireless device 116 at step 514.

As previously discussed herein, directory structure 300 may be created on enterprise server 104. However, directory structure 300 may also be created on a computer of the user, or a computer otherwise associated with the user, such as the computer of a manager employed by, affiliated with, etc., a user company, for instance. Where directory structure 300 is created on a user company computer and it resides on the user company computer, the file system will check directory structure 300 on the user computer company computer for a change(s) and the file system will notify enterprise server 104 of a change(s) to directory structure 300.

Figure 6:
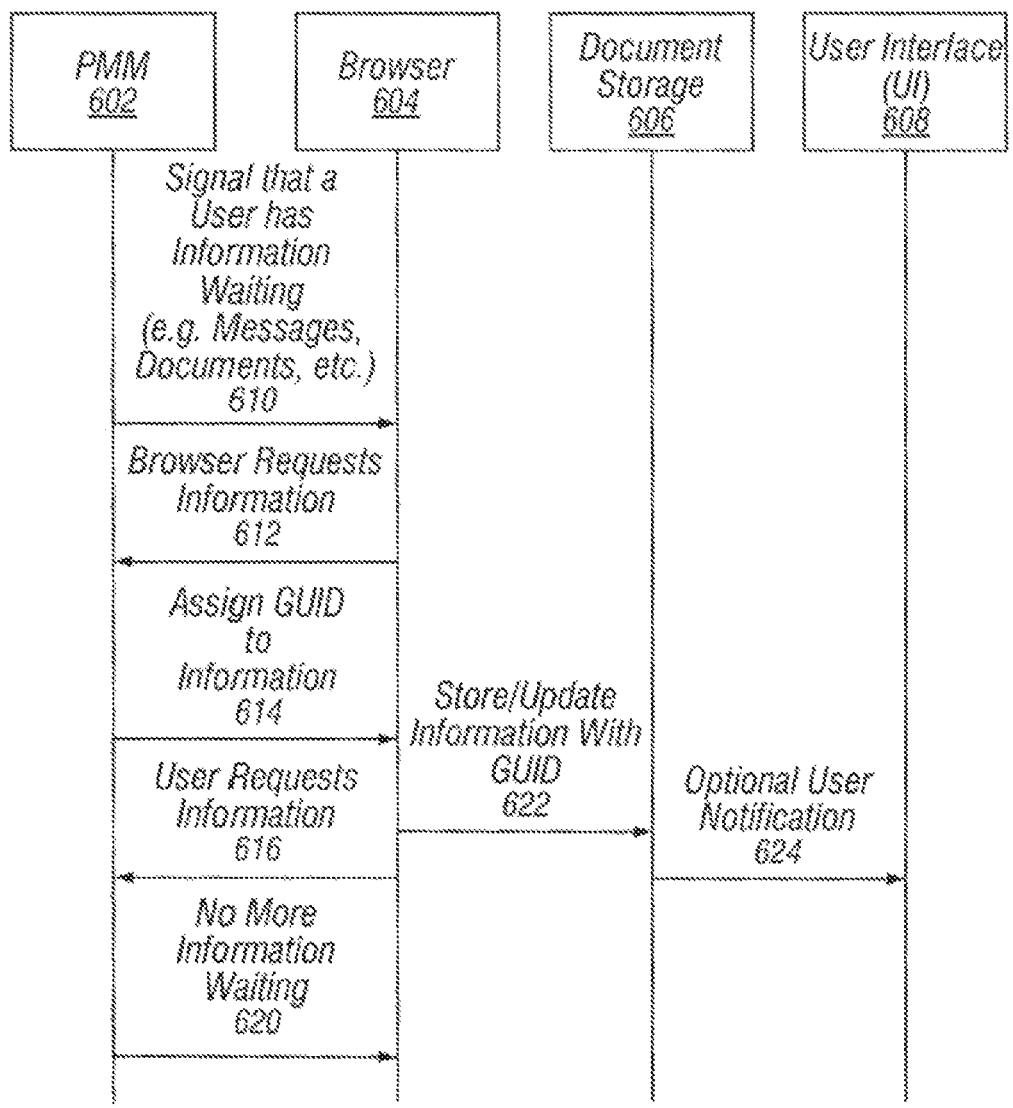
FIG. 6 is a schematic diagram illustrating a process for forwarding updated information to a wireless device, in accordance with an embodiment of the present invention.

FIG. 6 is a schematic diagram illustrating a process for forwarding updated information to wireless device 116 in accordance with an embodiment of the present invention. PMM 602, browser 604, document storage, 606 and user interface 608 on wireless device 116 associated with the user, are in communication by way of one another. At step 610, when PMM 602 receives information from the server (e.g., enterprise server 104), PMM 602 passes a signal to browser 604 on wireless device 116 that the user has current messages. At step 612, browser 604 requests the information, as shown in FIG. 6. At step 614, the information is assigned a unique identifier and forwarded. As indicated in FIG. 6, the information may be a document, among other things. The information may include any type of new or modified data suitable for use with the present invention. At step 616, browser 604 sends an acknowledgment that the information was received and requests the next message and so on until no more information exists, as indicated at step 620. An error message may be sent by wireless device 116 of the user and/or PMM 602 if the message was not received or non-delivery was caused.

It should be noted that this is just one exemplary implementation. Other implementations are possible. For example, PMM 602 can send the messages directly instead of sending a signal and letting the client retrieve the messages.

At step 622, the information may be stored and/or updated with the assigned unique identifier in document storage area 606 on wireless device 116. Optionally, a notification may be forwarded to the user at step 624 via a user interface 608 on wireless device 116 and/or a user interface on a fixed computing device. This notification may indicate that the information has been forwarded to wireless device 116. Such notification may alert the user that wireless device 116 of that user has been updated in accordance with new or modified information on the fixed computing device of the user.

As discussed herein, PMM 602 may receive the information and send a push notification to each wireless device 116 that is to receive the information. Transmission of the information can be secured by encrypting it and sending it to wireless device 116 using a technology such as transport layer security (TLS) or wireless transport layer security (WTLS).

If PMM 602 does not receive a request from wireless device 116 for the information (e.g. documents, messages) waiting, PMM 602 may res end the notification. The time intervals for resending a notification may be specified. Other conditions for resending the notification may also be specified. These conditions include resending the notification when wireless device 116 comes back into coverage, when wireless device 116 is turned back on, when a new message arrives at PMM 602, etc.

A new or additional wireless device 116 may also be provisioned utilizing a system and method according to the present system. For example, the user may synchronize a new or additional wireless devices with a fixed computing device of the user. In this scenario, the server may recognize all of the files in the file system as new files and replicate them on wireless device 116 of the user. Accordingly, each file may be assigned a unique identifier and the database may be updated with the information and the unique identifier.

Figure 7:
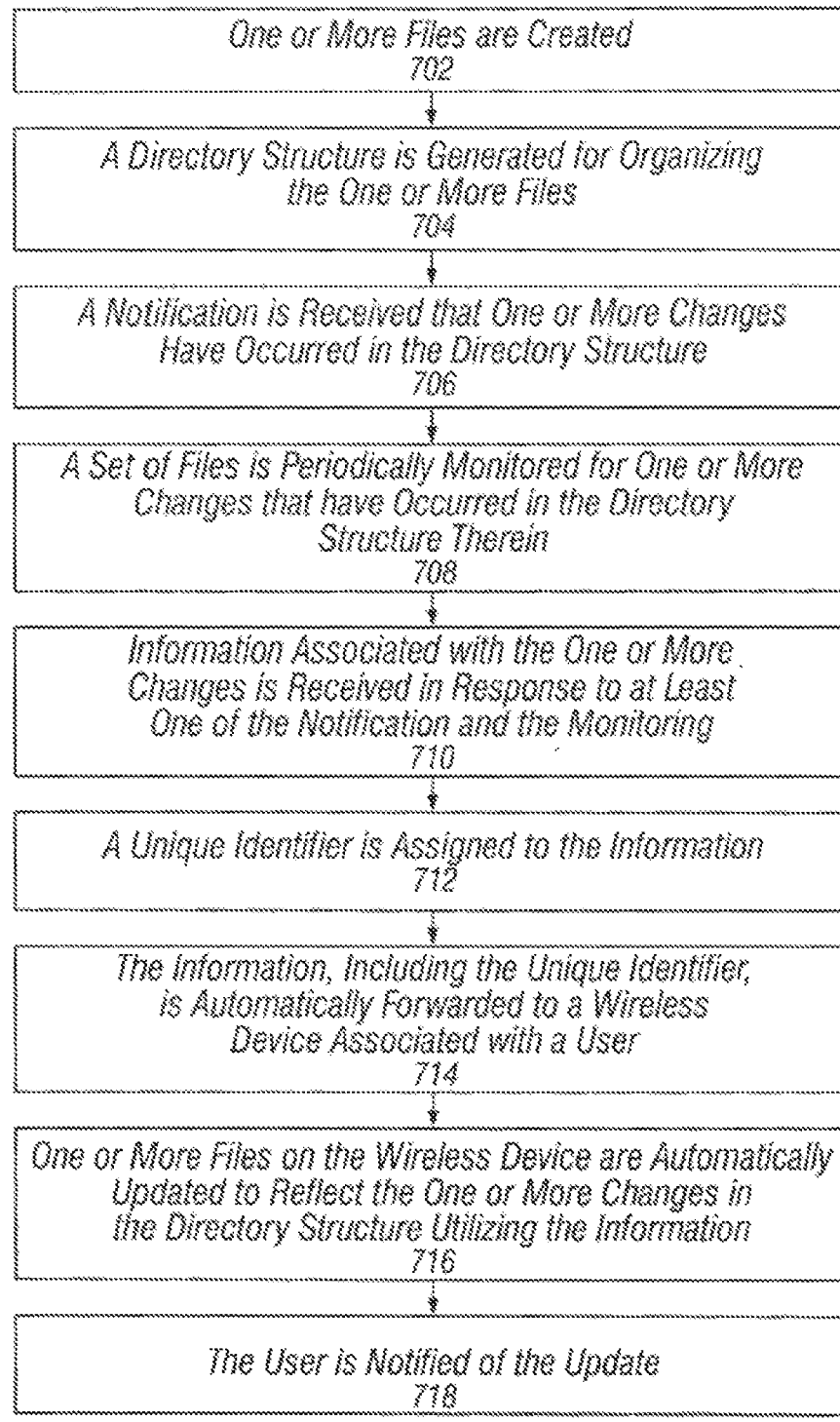
FIG. 7 is a flowchart illustrating a process for updating a wireless device, in accordance with an embodiment of the present invention.

FIG. 7 is a flowchart illustrating a process for updating wireless device 116 in accordance with an embodiment of the present invention. At step 702, one or more files are created. At step 704, a directory structure, such as directory structure 300, is generated for organizing the one or more files. At step 706, a notification is received that a change(s) has occurred in directory structure 300. At step 708, a set of files is periodically monitored for a change(s) that has occurred in directory structure 300 therein. At step 710, information associated with the change(s) is received in response to at least one of the notification and the monitoring. At step 712, a unique identifier is assigned to the information. At step 714, the information, including the unique identifier assigned thereto, is automatically forwarded to a wireless device associated with a user. At step 716, one or more files on wireless device 116 are automatically updated to reflect the change(s) to the directory utilizing the information. At step 718, the user is notified of the update.

As discussed herein, a change(s) may include a modification to an existing file in directory structure 300, the addition of a new file, etc. Where the change(s) includes a change(s) to an existing file in directory structure 300, the information forwarded may include information for replacing the previous file with a new file including the change(s) to the existing file. In other words, the change(s) may be used to overwrite the pre-existing file.

A notification of a change(s) may be forwarded to the server to alert the server of change(s) to directory structure 300. Furthermore, a notification may be forwarded to a user associated with one or more wireless devices 116 that wireless device 116 has been updated. The notification may be forwarded to the user via wireless device 116 of the user and/or the fixed computing device of the user. Enterprise server 104 may periodically access the file system in order to determine whether change(s) to directory structure 300 have been made. In this scenario, notification may not be forwarded to enterprise server 104 regarding the change(s) in directory structure 300. Rather, notification may be sent to the user of the change(s) or the information may be forwarded to wireless device 116 without notifying the user of the update.

As discussed herein, enterprise server 104 may include various modules for processing the information associated with the change(s). Enterprise server 104 can include a module backplane for connecting to the various modules.

Figure 8:
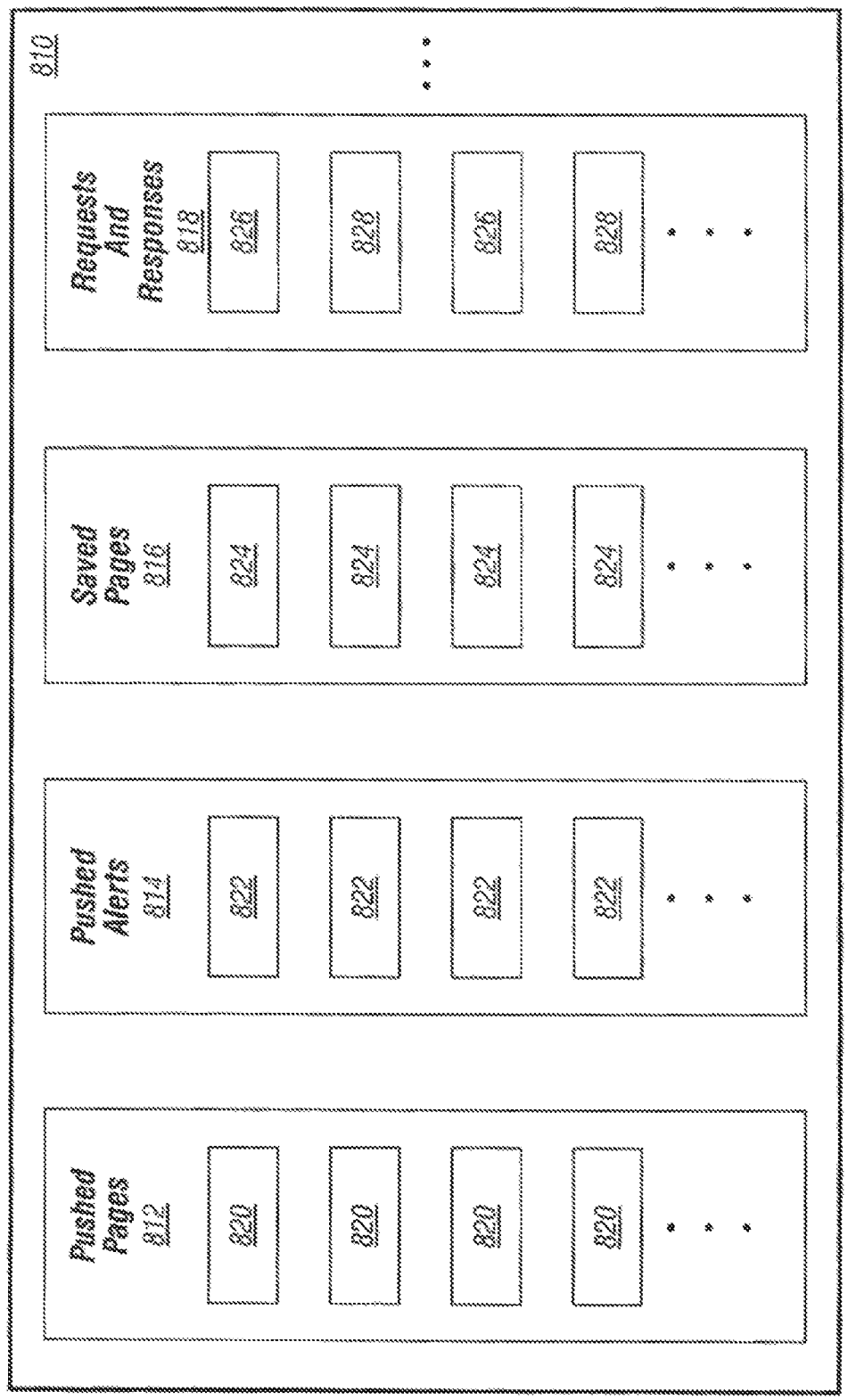
FIG. 8 is a schematic diagram of an information repository, in accordance with an embodiment of the present invention.

Referring to FIG. 8, in one embodiment, information repository 810 resides on wireless device 116. It is contemplated that in alternate embodiments' information repository 810 can reside elsewhere, however. Information repository 810 is used to house the set of files discussed herein, including information elements such as documents, alerts, pages, requests, responses and any other suitable information that is pushed to wireless device 116. In one exemplary embodiment, information repository 810 comprises sub-information-repositories 812, 814, 816 and 818. Information repository 810 can comprise additional sub-information-repositories as well.

Pushed pages sub-information-repository 812 comprises pushed pages 820 that have been pushed to wireless device 116 from enterprise server 104. Pushed alerts sub-information-repository 814 comprises pushed alerts 822 that have been pushed to wireless device 116 from enterprise server 104. Saved pages sub-information-repository 816 comprises saved pages 824 that have been saved to wireless device 116, either automatically by a script or by a user. Requests and responses sub-information-repository 818 comprises requests 826 and corresponding responses 828 that have been pushed/saved to wireless device 116. In one embodiment, the various information elements, including pushed pages 820, pushed alerts 822, saved pages 824, requests 826, responses 828, etc., comprise a mark-up language and a state (defined by variables). In one embodiment, each information element has a unique identifier associated therewith. This association can be useful for updating the information elements.

Pushed pages 820 are items that an application or a person wants to store directly on wireless device 116 via a push. Saved pages 824 are primarily user-initiated saves (although the saves can be initiated by an application). Since saved pages 824 are usually user-initiated they are usually the result of a particular request. For example, a user might save an information page that he or she looked up in a company directory or the confirmation number from a stock order, etc.

As another example, pushed page 820 is pushed to wireless device 116 by an application. Pushed page 820 comprises a price list dated Apr. 2, 2002. Pushed page 820 has a unique identifier, 0050, associated therewith. On Apr. 9, 2002, the price list has been updated. A new pushed page 820, comprising the updated price list, is pushed to wireless device 116 with the same unique identifier of 0050. Consequently, new pushed page 820 comprising the April 9 price list overwrites pushed page 820 comprising the April 2 price list. This concept is discussed herein and referred to herein as "unique identifier overwrite."

Pushed alerts 822 are similar to pushed pages 820, except for the fact that pushed alerts 822 are intended to be used for more transient objects and for the fact that a dialog box is displayed to a user, which shows the alert. In the case of pushed alerts 822, in one embodiment, the user sees a dialog box with alert 822 that has been pushed to pushed alerts sub-information-repository 814. A title of the alert is displayed along with a time of the alert. Actions can be taken, in some instances. For example, the alert is from a financial institution and states that the price of Acme Corporation stock dropped 20 points. The user is prompted as to whether he or she wishes to purchase shares of Acme Corporation.

Saved pages 824 are implemented when a user is interacting with an application and he or she wants to save what is on a screen of wireless device 116. Some examples of saved pages include stock quotes, information pages, news reports, etc. Another use of saved pages 824 is when a user is filling out a form. For example, a user causes an order entry form to be pushed to wireless device 116 and stored in pushed pages sub-information-repository 812 (in information repository 810) as pushed page 820. Subsequently, the user brings up the form on wireless device 116 because he or she wants to enter an order. While the user is filling out the form, the user discovers that he or she does not have all of the information that the form requires. The user then saves, in saved pages sub-information-repository 816, the page containing the form with the current state of the form. The partially filled-out form is saved as saved page 824. The user can later retrieve the page containing the partially filled-out form, and then finish filling out the form.

Requests and responses sub-information-repository 818 is useful when, for example, a user wants to submit a form to enterprise server 104. A user causes the form to be pushed into requests and responses sub-information-repository 818 and stored as request 826. Request 826 is automatically transmitted to enterprise server 104 when wireless device 116 is in coverage, i.e., there is enough bandwidth to complete the transaction without error.

Once request 826 is submitted, the user can see which request 826 was submitted to enterprise server 104, when request 826 was sent, etc. The results of request 826 are eventually received by wireless device 116 and pushed into requests and responses sub-information-repository 818 as response 828. The user can then view the results as response 828.

Figure 9:
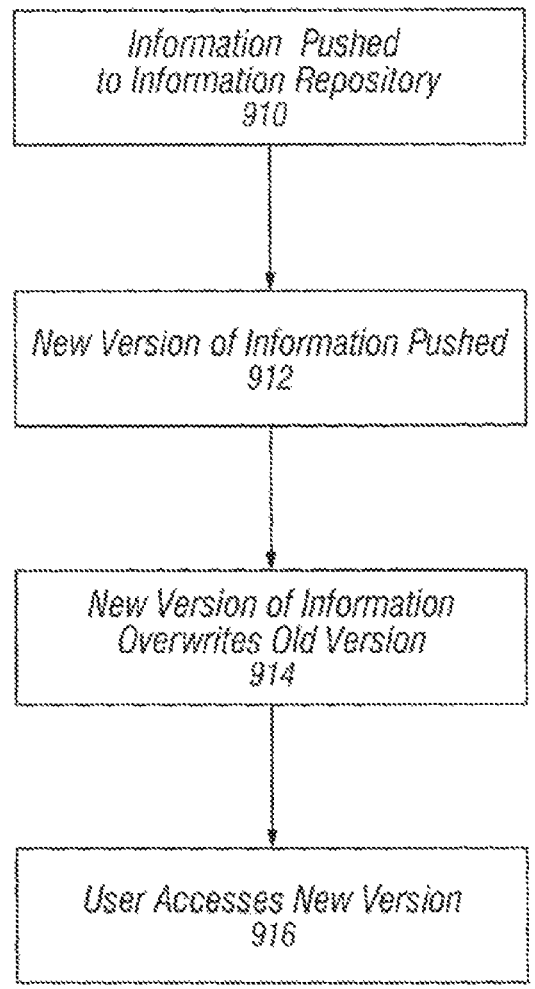
FIG. 9 is a flowchart illustrating unique identifier overwrite, in accordance with an embodiment of the invention.

Referring to FIG. 9, one specific example of unique identifier overwrite is examined. At step 910, information is pushed from PMM 106 of enterprise server 104 to an appropriate sub-information-repository of information repository 810 on wireless device 116. In this example, the information is a price list, sent by an Information Technology (IT) Manager. However, the information can be sent automatically or by any suitable person or application.

The price list has a unique identifier of 0078 associated therewith. At some later time, at step 912, the IT Manager has a new price list that he or she causes PMM 106 to push to the appropriate sub-information-repository of information repository 810 on wireless device 116 with the same unique identifier. At step 914, the new price list overwrites the previous price list stored in information repository 810. At step 916, a user of wireless device 116 accesses the new price list.

Figure 10:
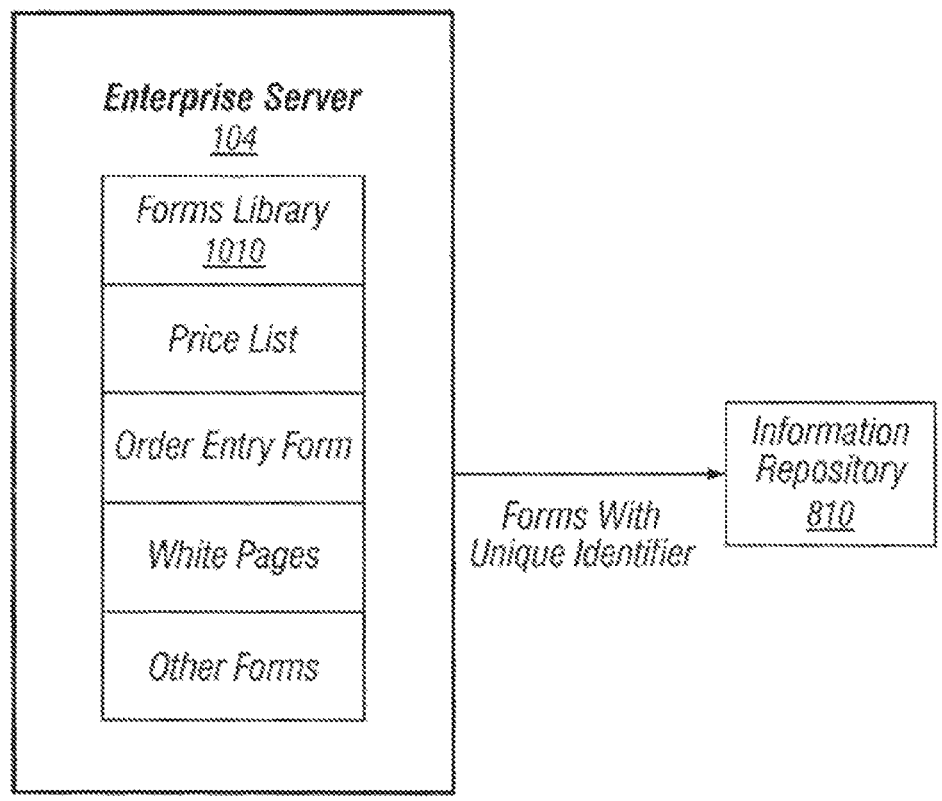
FIG. 10 is a schematic diagram illustrating one exemplary use for the information repository, in accordance with an embodiment of the present invention.

Referring to FIG. 10, one exemplary use of information repository 810 is illustrated. Forms library 1010 resides on enterprise server 104 and wireless device 116. Forms library 1010 includes forms (documents) such as price lists, order entry forms, white pages and various other forms. Each of the forms in forms library 1010 has a unique identifier associated therewith. When one of the forms in forms library 1010 is modified, the modified version is sent to wireless device 116 with the same unique identifier as the form had before. Thus, the modified version of the form overwrites the previous version of the form at information repository 810. Therefore, a user of wireless device 116 always has all of the latest forms he or she might need ready in information repository 810 for use. This update process is accomplished with the use of the unique identifiers. In one embodiment, an IT manager enables the user to receive updates to a set of standard forms. In another embodiment, the IT manager enables the user to receive updates to a set of standard forms, and the user requests any additional form(s) for which he or she wants automatic updates for.

In yet another embodiment according to the present invention, an application (e.g., Siebel, another suitable application such as a thin client application with scripting, etc.) running on wireless device 116 saves a page on wireless device 116 using a unique identifier. Script extensions, such as WML script extensions, Java script extensions, etc., allow an application to programmatically save a page on wireless device 116.

For example, a user of wireless device 116 may have a list, every day, of actionable items to which he or she is supposed to attend. It may be very important for the user to receive the daily list of actionable items from enterprise server 104, even if wireless device 116 is not in coverage. The application, at the beginning of each day when the user logs on to wireless device 116, displays the list of actionable items and saves the list to information repository 810. It is desired that only one item in information repository 810 is a daily list of actionable items. Therefore, the application programmatically saves the list to information repository 810 with a unique identifier using a script extension. More precisely, the application pushes the list to pushed pages sub-information-repository 812. The user can then interact with and/or modify the page containing the list. Whenever the application saves a new updated list to information repository 810, the same unique identifier is used. Consequently, the new updated list overwrites the previous list so that there is only one copy of the list in information repository 810, as desired. The user can recall the list at any time by prompting the application to load the list from information repository 810, using the same unique identifier. As can be seen, the application can load, save and overwrite information (pages, etc.) using unique identifiers. Information repository 810 thus functions similarly to a local cache or database that the application/user can access without accessing enterprise server 104 (for example, when wireless device 116 is not in coverage, etc.).

Figure 11:
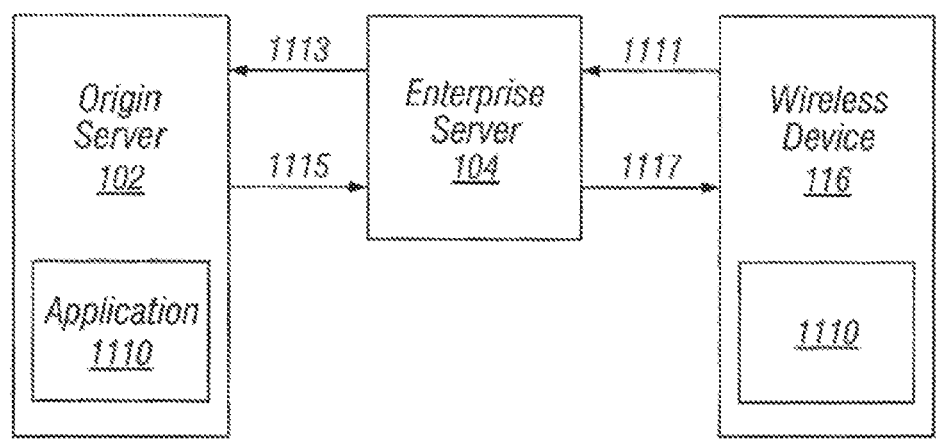
FIG. 11 is a schematic diagram illustrating one exemplary process flow, in accordance with an embodiment of the present invention.

In one exemplary process flow, shown schematically in FIG. 11, at step 1111, application 1110 on wireless device 116 makes a request for information, such as a daily list of actionable items, to enterprise server 104. Application 1110 can be a thin client application with scripting, or any other suitable type of application.

At step 1113, enterprise server 104 handles the request and gives this request to origin server 102 (which also runs application 1110). Origin server 102 uses application 1110 logic to facilitate processing of the request. Origin server 102 is a web server or application server that hosts the application, e.g., a server running Siebel, BEA WebLogic, Microsoft IIS, etc.

Application 1110, on origin server 102, generates results (a page). At step 1115, origin server 102 returns the results to enterprise server 104. At step 1117, enterprise server 104 send the results to wireless device 116 for display to the user. More precisely, application 1110 on origin server 102 is sending a page(s) of markup language to wireless device 116. Within that markup language is scripting code. Application 1110 on origin server 102 is sending back a program(s) that runs on wireless device 116. The scripting code is generated at origin server 102. Application 1110 on origin server 102 sends a page that has a program(s) (scripting language) contained within the page. The program(s) is executed on wireless device 116.

Figure 12:
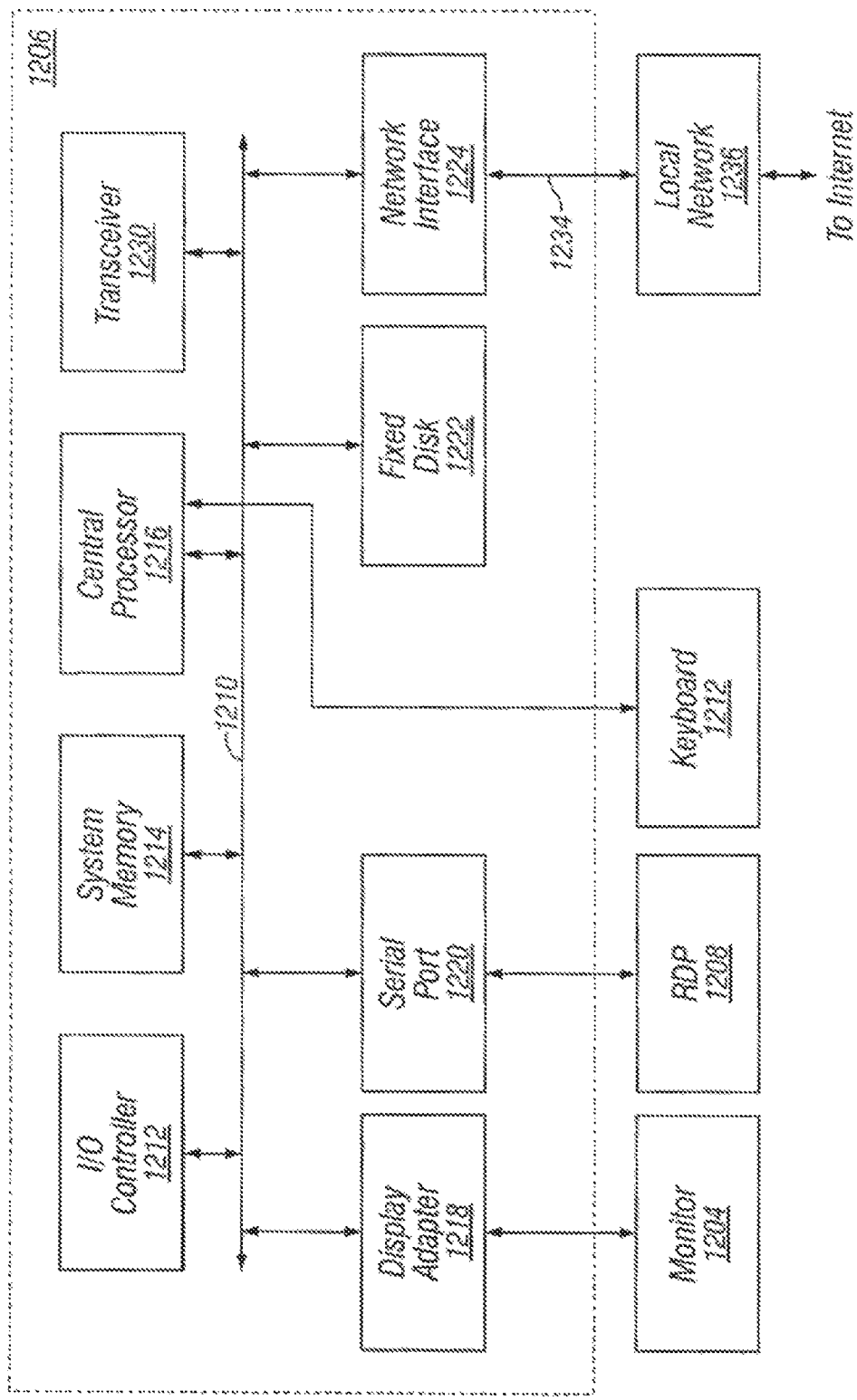
FIG. 12 illustrates subsystems of an exemplary computer system for use with the present invention.

FIG. 12 illustrates subsystems found in one exemplary computer system, such as computer system 1206 that can be used in accordance with embodiments of the present invention. Computers can be configured with many different hardware components and can be made in many dimensions and styles (e.g., laptop, palmtop, server, workstation and mainframe). Thus, any hardware platform suitable for performing the processing described herein is suitable for use with the present invention.

Subsystems within computer system 1206 are directly interfaced to an internal bus 1210. The subsystems include an input/output (I/O) controller 1212, a system random access memory (RAM) 1214, a central processing unit (CPU) 1216, a display adapter 1218, a serial port 1220, a fixed disk 1222 and a network interface adapter 1224. The use of bus 1210 allows each of the subsystems to transfer data among the subsystems and, most importantly, with CPU 1216. External devices can communicate with CPU 1216 or other subsystems via bus 1210 by interfacing with a subsystem on bus 1210.

FIG. 12 is merely illustrative of one suitable configuration for providing a system in accordance with the present invention. Subsystems, components or devices other than those shown in FIG. 12 can be added without deviating from the scope of the invention. A suitable computer system can also be achieved without using all of the subsystems shown in FIG. 12. Other subsystems such as a CD-ROM drive, graphics accelerator, etc., can be included in the configuration without affecting the performance of computer system 1206.

One embodiment according to the present invention is related to the use of an apparatus, such as computer system 1206, for implementing a system according to embodiments of the present invention. CPU 1216 can execute one or more sequences of one or more instructions contained in system RAM 1214. Such instructions may be read into system RAM 1214 from a computer-readable medium, such as fixed disk 1222. Execution of the sequences of instructions contained in system RAM 1214 causes the CPU 1216 to perform process steps, such as the process steps described herein. One or more processors in a multi-processing arrangement may also be employed to execute the sequences of instructions contained in the memory. In alternative embodiments, hard-wired circuitry may be used in place of or in combination with software instructions to implement the invention. Thus, embodiments of the invention are not limited to any specific combination of hardware circuitry and software.

The terms "computer-readable medium" and "computer-readable media" as used herein refer to any medium or media that participate in providing instructions to CPU 1216 for execution. Such media can take many forms, including, but not limited to, non-volatile media, volatile media and transmission media. Non-volatile media include, for example, optical or magnetic disks, such as fixed disk 1222. Volatile media include dynamic memory, such as system RAM 1214. Transmission media include coaxial cables, copper wire and fiber optics, among others, including the wires that comprise one embodiment of bus 1210. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, punch cards, paper tape, any other physical medium with patterns of marks or holes, a RAM, a PROM, an EPROM, a FLASHEPROM, any other memory chip or cartridge, a carrier wave, or any other medium from which a computer can read.

Various forms of computer-readable media may be involved in carrying one or more sequences of one or more instructions to CPU 1216 for execution. Bus 1210 carries the data to system RAM 1214, from which CPU 1216 retrieves and executes the instructions. The instructions received by system RAM 1214 can optionally be stored on fixed disk 1222 either before or after execution by CPU 1216.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for managing data on a wireless device, the method comprising:
   receiving, at the wireless device, a notification pushed to the wireless device from a push server associated with an enterprise application, wherein the notification is associated with a first information element and is configured to notify a user of the wireless device of availability of the first information element from the enterprise application running on a remote server;
   receiving, at the wireless device, a resending of the notification from the push server associated with the enterprise application, wherein the resending of the notification is in response to a determination of not receiving a request for the first information element from the wireless device;
   sending, at the wireless device, a request for the first information element from the wireless device to the push server associated with the enterprise application in response to receiving the resending of the notification;
   receiving, at the wireless device, the first information element from the enterprise application running on a remote server, the first information element comprising a unique identifier associated therewith;
   replacing, at the wireless device, within an information repository, a second information element with the first information element upon determination that the unique identifier associated with the first information element is the same as a unique identifier associated with the second information element; and
   making the first information element in the information repository available to a user of the wireless device.

2. The method of claim 1, wherein the second information element comprises an application and the first information element comprises an updated version of the application.

3. The method of claim 1, wherein the second information element comprises an application with scripting and the first information element comprises an updated version of the application with scripting.

4. The method of claim 1, wherein the resending of the notification is triggered when the wireless device comes back into coverage.

5. The method of claim 4, wherein the second information element comprises an application with scripting and the first information element comprises an updated version of the application with scripting.

6. The method of claim 1, wherein the resending of the notification is triggered when the wireless device is turned back on.

7. The method of claim 1, wherein the resending of the notification is triggered when a new message arrives at the push server associated with the enterprise application.

8. The method of claim 1, wherein the push server comprises a push management module in communication with the enterprise application.

9. The method of claim 1, wherein the first information element is a document.

10. The method of claim 1, wherein the first information element is an alert.

11. The method of claim 10, wherein receiving of the alert causes a notification to be displayed on a screen of the wireless device.

12. The method of claim 1, wherein the first information element is a page.

13. The method of claim 1, wherein the first information element is a request.

14. The method of claim 1, wherein the first information element is a response.

15. The method of claim 1, further comprising:
storing, at the wireless device, within the information repository, a third information element created on the wireless device by the user of the wireless device, the third information element being associated with the enterprise application and comprising a unique identifier associated therewith; and
transmitting, from the wireless device to the server, the third information element.

16. The method of claim 15, wherein:
the first information element comprises a request associated with the enterprise application,
the third information element comprises a user response to the request associated with the enterprise application, and
the second information element comprises a response associated with the enterprise application to the user response.

17. The method of claim 15, wherein one or more of the unique identifier associated with the first information element, the unique identifier associated with the second information element, or the unique identifier associated with the third information element is a global unique identifier.

18. A non-transitory, computer-readable medium comprising computer-executable instructions that, when executed by a processor in a computing device, cause the computing device to perform a method of managing data on a wireless device, the method comprising:
receiving, at the wireless device, a notification pushed to the wireless device from a push server associated with an enterprise application, wherein the notification is associated with a first information element and is configured to notify a user of the wireless device of availability of the first information element from the enterprise application running on a remote server;
receiving, at the wireless device, a resending of the notification from the push server associated with the enterprise application, wherein the resending of the notification is in response to a determination of not receiving a request for the first information element from the wireless device;
sending, at the wireless device, a request for the first information element from the wireless device to the push server associated with the enterprise application in response to receiving the resending of the notification;
receiving, at the wireless device, the first information element from the enterprise application running on a remote server, the first information element comprising a unique identifier associated therewith;
replacing, at the wireless device, within an information repository, a second information element with the first information element upon determination that the unique identifier associated with the first information element is the same as a unique identifier associated with the second information element; and
making the first information element in the information repository available to a user of the wireless device.

19. A method for managing applications on a wireless device, the method comprising:
receiving, at the wireless device, a notification pushed to the wireless device from a push server associated with an enterprise application, wherein the notification is associated with an information element and is configured to notify a user of the wireless device of availability of the information element from the enterprise application running on a remote server;
receiving, at the wireless device, a resending of the notification from the push server associated with the enterprise application, wherein the resending of the notification is in response to a determination of not receiving a request for the information element from the wireless device;
sending, at the wireless device, a request for the information element from the wireless device to the push server associated with the enterprise application in response to receiving the resending of the notification;
receiving, at the wireless device, the information element from the remote server, the information element comprising a first application and a unique identifier associated with the first application;
replacing, at the wireless device, within an information repository, a second application with the first application upon determination that the unique identifier associated with the first application is the same as a unique identifier associated with the second application; and
making the first application in the information repository available to a user of the wireless device.

20. The method of claim 19, wherein the resending of the notification is triggered when the wireless device comes back into coverage.

21. The method of claim 19, wherein the resending of the notification is triggered when the wireless device is turned back on.

22. The method of claim 19, wherein the first application is an updated version of the second application.

23. A non-transitory, computer-readable medium comprising computer-executable instructions that, when executed by a processor in a computing device, cause the computing device to perform a method of managing applications on a wireless device, the method comprising:
receiving, at the wireless device, a notification pushed to the wireless device from a push server associated with an enterprise application, wherein the notification is associated with an information element and is configured to notify a user of the wireless device of availability of the information element from the enterprise application running on a remote server;

receiving, at the wireless device, a resending of the notification from the push server associated with the enterprise application, wherein the resending of the notification is in response to a determination of not receiving a request for the information element from the wireless device;

sending, at the wireless device, a request for the information element from the wireless device to the push server associated with the enterprise application in response to receiving the resending of the notification;

receiving, at the wireless device, the information element from the remote server, the information element comprising a first application and a unique identifier associated with the first application;

replacing, at the wireless device, within an information repository, a second application with the first application upon determination that the unique identifier associated with the first application is the same as a unique identifier associated with the second application; and making the first application in the information repository available to a user of the wireless device.

24. A system for managing applications on a wireless device, comprising: a memory comprising computer-executable program code;

a processor in data communication with the memory and configured to execute the computer-executable program code in order to cause the system to:

receive, at the wireless device, a notification pushed to the wireless device from a push server associated with an enterprise application, wherein the notification is associated with an information element and is configured to notify a user of the wireless device of availability of the information element from the enterprise application running on a remote server;

receive, at the wireless device, a resending of the notification from the push server associated with the enterprise application, wherein the resending of the notification is in response to a determination of not receiving a request for the information element from the wireless device;

send, at the wireless device, a request for the information element from the wireless device to the push server associated with the enterprise application in response to receiving the resending of the notification;

receive, at the wireless device, the information element from the remote server, the information element comprising a first application and a unique identifier associated with the first application;

replace, at the wireless device, within an information repository, a second application with the first application upon determination that the unique identifier associated with the first application is the same as a unique identifier associated with the second application; and make the first application in the information repository available to a user of the wireless device.

* * * * *